US008801833B2

(12) United States Patent
Castelli

(10) Patent No.: US 8,801,833 B2
(45) Date of Patent: Aug. 12, 2014

(54) DE-POWDERING PLANT FOR A SCRAP SHREDDING MACHINE AND RELATIVE METHOD

(75) Inventor: Luigi Castelli, Palmanova (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 0 days.

(21) Appl. No.: 13/877,039

(22) PCT Filed: Sep. 30, 2011

(86) PCT No.: PCT/IB2011/002303

§ 371 (c)(1), (2), (4) Date: Mar. 29, 2013

(87) PCT Pub. No.: WO2012/042365

PCT Pub. Date: Apr. 5, 2012

(65) Prior Publication Data

US 2013/0186271 A1 Jul. 25, 2013

(30) Foreign Application Priority Data

Oct. 1, 2010 (IT) .............................. UD2010A0179

(51) Int. Cl.
*B01D 53/02* (2006.01)

(52) U.S. Cl.
USPC .................................... 95/92; 96/126; 96/136

(58) Field of Classification Search
USPC ........................................ 95/92; 96/126, 136
See application file for complete search history.

(56) References Cited

U.S. PATENT DOCUMENTS

2005/0028672 A1 2/2005 Hickerson et al.
2010/0251938 A1 * 10/2010 Comrie ........................ 106/707

FOREIGN PATENT DOCUMENTS

JP 2001-272023 10/2001
WO 2009/156432 12/2009

* cited by examiner

*Primary Examiner* — Christopher P Jones
(74) *Attorney, Agent, or Firm* — Hamre, Schumann, Mueller & Larson, P.C.

(57) ABSTRACT

A de-powdering plant is able to be used downstream of a shredding machine and comprises a first section for processing a primary stream of powder and air arriving from a first exit line from the shredding machine, which comprises a unit for damping powders using humidity connected to an air intake downstream of the shredding machine. The first processing section also comprises a processing unit using active carbons filtration, downstream of the unit for damping powders using humidity, suitable for the adsorption of the volatile organic substances present in a stream of air exiting from the unit for damping powders using humidity. The plant comprises heating means to heat, directly or indirectly, the stream of air saturated with humidity exiting from the unit for damping powders using humidity, before it enters into the processing unit using active carbons filtration.

13 Claims, 1 Drawing Sheet

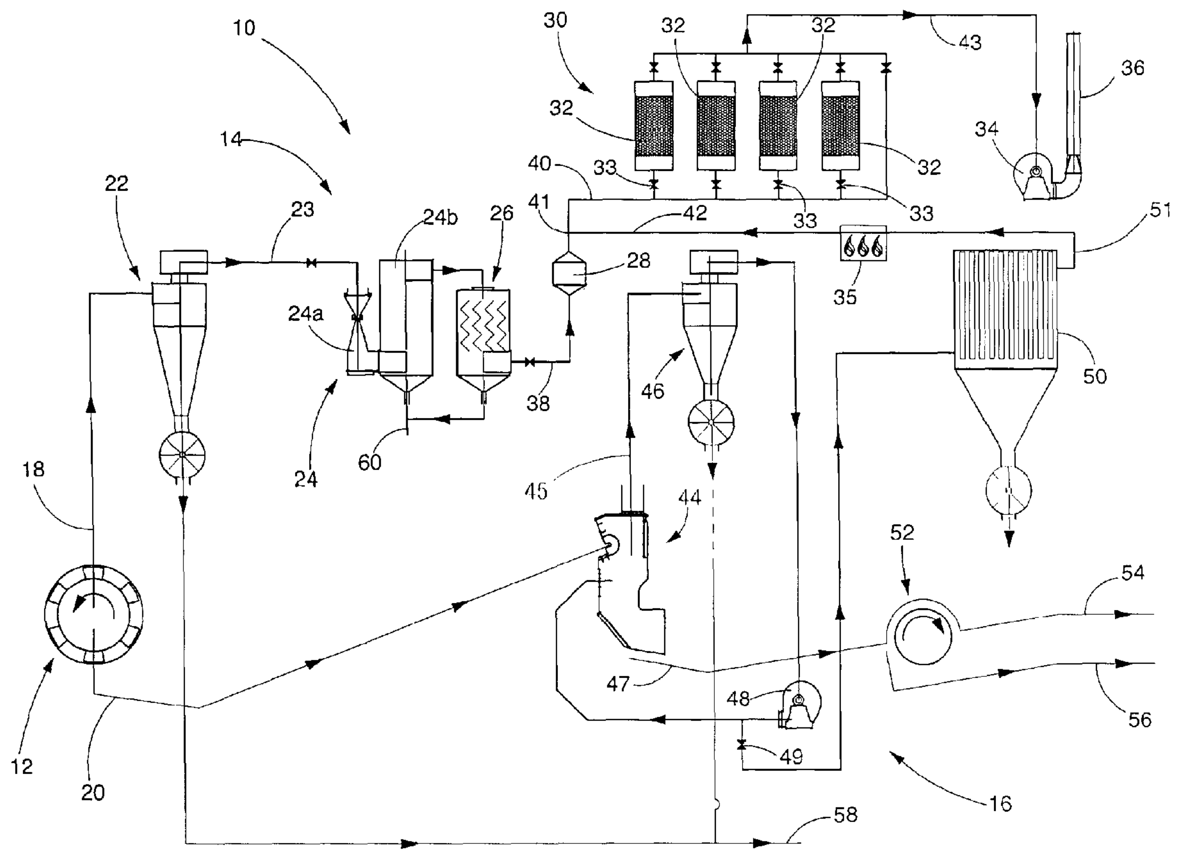
10
30
32
32
32
32
32
43
36
34
14
40
33
33
33
33
22
23
24b
26
41
42
51
28
35
24a
50
38
46
24
60
18
45
44
52
54
12
20
47
48
56
49
16
58

DE-POWDERING PLANT FOR A SCRAP SHREDDING MACHINE AND RELATIVE METHOD

FIELD OF THE INVENTION

The present invention concerns a de-powdering plant for a scrap shredding machine, and the relative method, by means of which to control the atmospheric emissions of the scrap shredding machine, both with regard to the content of powders and with regard to the total content of organic carbon (TOC).

BACKGROUND OF THE INVENTION

Scrap shredding machines are known, in particular for automobile bodies, for example, from the international application WO-A-2009/156432.

Normally, shredding machines operate in the presence of nebulized water in order to limit the risk of explosions due to the possible presence of flammable materials in the gas tanks of the car to be scrapped.

There are two streams exiting from the shredding and sorter machines, a primary one, from the shredder, consisting of air and powders generated by the crushing of the materials entering the machine, and a secondary one, which is coarser, coming from the air separator downstream of the shredder, which processes the heavier material, that is, in which the crushed material is progressively "selected" until the most accurate separation possible is obtained (ferrous, non-ferrous and "fluff").

The need to control and reduce emissions into the atmosphere coming from such shredding machines is known, both with regard to the content of powders and with regard to the total content of organic carbon (TOC—Total Organic Carbon).

However, there are shredding machines which, operating in areas without strict legislation, do not provide any processing of the air exiting from the machine.

On the other hand, for shredding machines installed in countries with more environmentally friendly legislation, the primary stream of air has to be processed in order to reduce the content of fine powders and TOC to below the desired limits, just as the secondary stream coming from the classification of the heavy or coarse material exiting from the shredding machine is processed.

In such cases, the primary stream is normally processed using a humidity purifier or a scrubber. The scrubber provides to separate the powders, but it is of limited efficiency for damping down the volatile organic substances and hence the TOC.

Document US-A-2005/028672 shows a filtering apparatus to remove pollutants and contaminants from a stream of exhaust gas originating from an incinerator, after it has passed through a scrubber, which provides, in series, a heating chamber, and adsorption chamber using active carbons and a filtering chamber with layers of HEPA filters. In particular, only the exhaust stream exiting from the scrubber is fed to the heating chamber.

Document JP-A-2001272023 shows a method to remove powders, HCl, $SO_x$, $NO_x$, dioxins and other pollutants from a stream of exhaust gas coming from an incinerator. The method provides the use of a cyclone unit, an electric powder collector and a scrubber. The powder of the stream to be processed is recovered by means of the cyclone unit and the electric powder collector, while $SO_x$, $NO_x$, are removed from the gas using the scrubber. After the scrubber, a heat exchanger is provided to which all the exhaust stream coming from the scrubber is exclusively fed, to be heated to 100° C.-200° C. Active carbon powder, which absorbs the dangerous components present in the gas, is then added to the heated stream.

However, both US-A-2005/028672 and JP-A-2001272023, since they are intended for processing exhaust gases from incinerators, and not gas coming from scrap shredding machines which have the risk of exploding as explained above, completely neglect this problem, providing, in a traditional way, the passage of the exhaust gases directly through a chamber or other direct heating device. As a consequence, these known solutions are not suitable for the purposes of the present invention.

Purpose of the present invention is to obtain a plant, and to perfect a relative method, for de-powdering downstream of a shredder machine which reduces and controls atmospheric emissions of powder and total organic carbon content.

A further purpose is that the plant, and the connected method, of the present invention are safe and reliable, avoiding the risk of exhaust gas explosions deriving from the shredding machines upstream.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the present invention, a de-powdering plant is used downstream of a shredding machine and comprises a first section for processing a primary stream of air and powders exiting from the shredding machine.

The first processing section comprises a powder damping unit using humidity, or scrubber, connected to an air intake downstream of the shredding machine.

According to the present invention, the plant also comprises a processing unit using active carbons filtration, downstream of the unit for damping powders using humidity, by means of which the air exiting from the latter is processed. The processing unit using active carbons filtration is suitable for the adsorption of the volatile organic substances present in a stream of air exiting from the unit for damping powders using humidity.

The active carbons have the technical effect of absorbing the vapors of organic substance present in the air exiting from the scrubber, damping the volatile organic substances, and thus the TOC content. In this way, the plant achieves the purpose of reducing both the powders present in the exit flue of the plant to a quantity less or equal to 10 $mg/m^3$' thanks to the scrubber, and also the TOC, with a content exiting the flue less or equal to 30 $mg/m^3$, thanks to the active carbons.

According to the present invention, the plant also comprises heating means to heat, directly or indirectly, the air saturated with humidity exiting from the unit for damping powders using humidity, before it enters into the processing unit using active carbons filtration.

The heating of the saturated air prevents condensation of the aqueous vapor in the active carbons, guaranteeing an increased efficiency of the process with the active carbons. In this way, the problem that the air exiting from the scrubber, saturated in water vapor, might condense and reduce the efficiency of the active carbons, is solved.

In some forms of embodiment of the present invention, the plant comprises a feed line for hot air, heated by means of the heating means, which is fluidically connected to the exit line of the stream of air from the scrubber, upstream of the processing unit using active carbons filtration, mixing with this in order to generate a stream of air with reduced humidity content entering the processing using active carbons.

Therefore, unlike in the state of the art, the present invention provides to feed to the processing unit using active carbons a stream of air deriving from the mix of the exhaust stream exiting from the scrubber with the hot air of the feed line. Therefore the air exiting from the scrubber does not pass in a dedicated heating mean, thus avoiding the risk of possible explosions, instead it is mixed in a suitable way with other hot air so as to increase the temperature and allow it to enter into the processing unit using active carbons in optimal operating conditions.

Traditionally, in some forms of embodiment of the present invention, a second processing section is also provided downstream of the shredding machine for classifying the heavier material arriving from the shredding machine. In particular the second processing section is configured to obtain a secondary gaseous stream exiting from a classifying unit, which is further processed to produce a stream of purified air.

According to one form of embodiment of the present invention, a line of the stream of purified air exiting from the second processing section constitutes the line of air which, heated by the heating means, is mixed with the line of saturated air exiting from the unit for damping powders using humidity.

In this way, there is the advantage of exploiting the integration of the air exiting from the classifying unit and the saturated air arriving from the scrubber.

In fact, the air arriving from the classifying unit is purified so as to be compatible with the saturated air, whose powder content has been damped by the scrubber and can be heated and mixed with the air to be processed on entering the active carbons, to reduce the humidity content of the latter.

In some forms of embodiment, the second processing section comprises, in sequence, a zigzag separator or classifier, for the heavy fraction, a separation unit for separating the light fraction, typically a cyclone-type unit for pre-damping powders, and a damping unit with a sleeve-type filter from which the stream of purified air exits.

In some forms of embodiment the second processing section comprises the heating means which heat the stream of purified air before it is mixed with the saturated air exiting from the unit for damping powders using humidity.

In some forms of embodiment, the heating means comprise a direct flame gas burner, which heats the stream of purified air exiting from the second processing station before it is mixed with the stream of saturated air exiting from the unit for damping powders using humidity.

The solution to reduce the humidity content of the air saturated with aqueous vapor exiting from the scrubber, and before it enters the active carbons, by mixing it with a line of auxiliary air advantageously arriving from the second processing section, and not directly using free flame heating means in line, favorably avoids the risk of possible explosions due to the possible presence of combustible vapors which may still be present in the processed air exiting from the scrubber.

According to the present invention, a stream of air is heated, advantageously purified air exiting from the second processing section, which does not have any possibility of having flammable vapors, typically arriving from the processing of a second gaseous stream which, in its turn, derives from the separation of the heavier or coarser material exiting from the shredding machine; this purified and heated air is mixed with the saturated air, reducing the humidity thereof.

The present invention also concerns a de-powdering method, which can be used downstream of a shredding machine and comprising a step of processing a primary stream of powders and air exiting from the shredding machine, which comprises an operation of damping the powders using humidity of the air exiting from an air intake downstream of the shredding machine.

The method of the present invention provides that the processing step of the primary stream also comprises a processing operation using active carbons filtration, subsequent to the operation of damping powders using humidity, suitable for the adsorption of the volatile organic substances present in a stream of air deriving from the operation of damping powders using humidity.

According to the present invention, a direct or indirect heating operation is provided to heat the stream of air saturated with humidity deriving from the operation of damping powders using humidity, before the stream of saturated air is subjected to the processing operation using active carbons filtration.

In this way the content of humidity of the stream of air entering the process using active carbons is reduced, preserving the efficiency thereof.

In some forms of execution of the present invention, the operation of heating the stream of air saturated with humidity is carried out by mixing a stream of heated air with the stream of saturated air, upstream of the processing operation using active carbons filtration.

In some forms of execution of the present invention, the method also provides a typical step of processing the heavier material arriving from the shredding machine, which is subjected to classification downstream of the shredding machine, suitable to obtain a secondary gaseous stream which is processed to produce a stream of purified air at outlet.

In these forms of execution, the method of the present invention provides to heat the stream of purified air exiting from the processing step of the heavier material and to mix it with the stream of air saturated with humidity arriving from the operation of damping powders using humidity.

In accordance with some forms of execution of the method of the present invention, the step of processing the heavier material comprises, in sequence, an operation of separating the heavy fraction to produce a secondary gaseous stream, an operation of separating the light fraction, typically pre-damping the powders, and an operation of damping the secondary gaseous stream by means of filtration with a sleeve filter.

According to some variants, the step of processing the heavier material provides to heat the stream of purified air extracted in this step before it is mixed with the stream of air saturated with humidity exiting from the operation of damping the powders using humidity.

In accordance with some forms of execution, the heating operation provides to use a direct flame gas burner which heats the stream of purified air exiting from the step of processing the heavier material and before it is mixed with the stream of saturated air exiting from the operation of damping the powders using humidity.

According to some forms of execution, the processing operation using active carbons filtration is carried out by means of active carbons modules operatively connected in parallel.

In variants of these forms of execution, the method provides to by-pass at least one of the modules, which remains inactive during the processing operation using active carbons filtration, so that, due to maintenance requirements or regeneration of one of the modules, the inactive module can be selectively disconnected, thus avoiding any stoppage of the processing operation.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 1 is a schematic view of a de-powdering plant according to the present invention used downstream of a shredding machine.

DETAILED DESCRIPTION OF A PREFERENTIAL FORM OF EMBODIMENT

With reference to the attached drawing, a de-powdering plant 10 according to the present invention is used downstream of a scrap shredding machine 12, of a known type, in particular, but not only, of the bodies of automobiles.

The shredding machine 12 generates a primary stream of powders and air, indicated by a first exit line 18, disposed in an air intake of the shredding machine 12. The shredding machine 12 also has a second exit line 20 for heavier fractions, or heavy material broken up by the shredding machine 12, which is progressively selected so as to achieve the most accurate separation possible (ferrous, non-ferrous and fluff), as will be explained hereinafter.

Generally, the flow rate of the air of the first exit line 18 is about 100,000 $m^3$/hr, whereas the flow rate of the air deriving from the second exit line 20 is about 10,000 $m^3$/hr.

The plant 10 comprises a first processing section 14 of the primary stream and a second processing section 16 for the classification of the heavier or coarser material arriving from the second exit line 20, from which a secondary gaseous stream 45 is generated which, as will be explained more fully hereafter, is further purified to produce a stream of purified air 51.

The first processing section 14 comprises a cyclone-type separator 22 fed by the first exit line 18 of the primary stream of powder and air.

Exiting from the cyclone-type separator 22 a stream of material is obtained which goes for classification, indicated by the arrow 58, and a stream of air 23 which is fed to a damping unit for powders using humidity, in this case a scrubber 24 with a Venturi effect.

In some forms of embodiment, the scrubber 24 comprises a Venturi throat 24*a* for nebulizing the washing water and a cyclone-type separator 24*b* which provides to separate the water exiting from the Venturi throat 24*a*.

The scrubber 24 typically requires connection to the water mains in order to feed the processing water, which is recirculated, and a vat to collect the discharge of the exhaust water.

The exhaust material exiting from the cyclone 24*b*, indicated by the arrow 60, is conveyed as sludge for thickening and subsequent disposal.

Downstream of the scrubber 24 a unit 26 to separate drops, or "demister", is provided, in this case of the type having thin blades, to further reduce the content of water drawn by the air stream to be processed. The stream of saturated air exiting from the unit to separate drops 26, indicated by the arrow 38, is sent to a processing unit using active carbons filtration 30, where it is made to pass through a bed of active carbons which provide to adsorb the volatile organic substances, the total organic carbon, as well as, advantageously, dioxins and PCB.

In some forms of embodiment, before being immersed in the processing unit using active carbons filtration 30, the air stream 38 exiting from the unit to separate drops 26 is made to pass through a damping unit using oily mists 28, in order to separate possible residues of oils, heavy hydrocarbons or similar.

The processing unit using active carbons filtration 30, in some forms of embodiment, is formed by a plurality of processing modules 32 using active carbons filtration. In some forms of embodiment, these modules 32 are operatively disposed in parallel. In some forms of embodiment, it may be provided, using a plurality of valves, in this case shutters 33, to determine the selective entrance of the stream of air to be processed only in some, or in all the modules 32.

In some forms of embodiment a by-pass is provided of at least one of said modules 32, so that it is idle during the process. In this way, during maintenance and/regeneration of one or more of the modules 32 which are actually in use, it is possible to intervene on the idle module 32, thus avoiding a stoppage of the plant.

In some forms of embodiment, four or more modules 32 are provided in parallel, mounted on trolleyed containers, as well as a supplementary module 32 always excluded from the circuit for the regeneration of exhaust carbon.

The processed and purified air stream exiting from the processing unit using active carbons filtration 30, shown by the arrow 43, is forcibly taken in by a ventilator 34 and sent to a discharge flue 36. The air exiting is purified with values of powder and total content of carbon substance within the limits of the law, respectively less than or equal to 10 mg/$m^3$ and less than or equal to 30 mg/$m^3$.

In some forms of embodiment, the ventilator 34 is provided with an inverter to adjust the speed depending on the losses of load of the circuit.

According to one feature of the present invention, the stream of saturated air 38 that is sent to the processing unit using active carbons filtration 30, possibly passing through the oily mists damping unit 28, is subjected to prior heating, before entering into the processing unit using active carbons filtration 30, so as to reduce the amount of humidity considerably, thus preventing any deterioration in the performance of the bed of active carbons.

In some forms of embodiment of the present invention, the stream of saturated air 38 is heated by mixing it, in correspondence with a junction 41 of the circuit, with a stream of hot air 42 coming from the second processing section 16, generating a stream of air 40 which is fed to the processing unit using active carbons filtration 30 with a considerable reduction in the humidity content.

In particular, the plant 10 of the present invention comprises heating means, in this case a gas burner 35 with a direct flame, located in line with the stream of air exiting from the second processing section 16, obtaining the desired stream of hot air 42.

The advantage of this solution, which avoids heating with a direct flame the stream of air 38 exiting from the unit for separating drops 26 and possibly from the oily mists damping unit 42, and which on the contrary heats it by mixing it with the stream of hot air 42, is that it eliminates the risk of triggering possible explosions due to the presence of residual hydrocarbons, combustibles or any other flammable material.

In some forms of embodiment of the invention, the tubes affected by the hot streams, and also the active carbons modules 32, are insulated to prevent the air from cooling.

In some forms of embodiment, the gas burner 35 allows to obtain a stream of hot air 42 with a temperature comprised between about 100° C. and about 150° C., in any case a temperature such that, considering the flow rates involved for the streams of saturated air 38 and of hot air 42, respectively about 100,000 $m^3$/hr and about 10,000 $m^3$/hr, a temperature of the air stream 40 is obtained which is higher by about 10° C. than the ambient temperature.

Typically the optimal working temperature of the active carbons, in order to have the filtration effect by means of adsorption, is comprised between about 30° C. and about 40° C.

The present invention, feeding a stream of hot air 40 to the processing unit using active carbons filtration 30 at a temperature of about 10° C. higher than ambient temperature, achieves a good compromise between filtration efficiency of the active carbons, which retain the volatile organic substance, and reduction of the humidity entering the active carbons.

At the same time, achieving a stream of hot air 40 by mixing the saturated air stream 38 and the hot air stream 42, and not by direct heating of the single stream of saturated air 38 passing through a heating chamber or device, eliminates the risk of explosions, guaranteeing the safety of the plant 10.

In some forms of embodiment of the plant 10, the second processing section 16 provides, in a traditional way, a zigzag classifier 44, to which the heavy fractions of the second exit line 20 from the shredding machine 12 arrive.

The zigzag classifier 44 generates the secondary gaseous stream, indicated by the arrow 45, and a heavy fraction of ferrous and non-ferrous materials and heavy fluff, see arrow 47 which, as explained hereafter, are sent for magnetic separation.

The secondary gaseous stream 45 exiting from the zigzag classifier 44 is fed to a unit for pre-damping powders, in this case a cyclone-type separator 46, from which a stream of air exits at the head to be sent in part to a filtering unit for the final damping of powders, in this case a sleeve-type filter 50, from which the stream of purified air 51 exits and is followed by a stream of material sent for classification or disposal 58.

Downstream of the cyclone separator 46 a ventilator 48 is provided to supply the desired suction pressure to the circuit, so as to send a large part of the air processed in the cyclone separator 46 returned to the zigzag classifier 44. The remaining part is sent, by acting on a valve, in this case a shutter 49, to the filtering unit for the final damping of powders, in this case a sleeve-type filter 50, to produce the stream of purified air 51.

In some forms of embodiment, the stream of purified air 51 exiting downstream of the final damping of the powders, in this case the sleeve-type filter 50, is heated by the in line heating means, in this case the burner 35, to generate the stream of hot air 42 which is subsequently mixed with the stream of saturated air 38, in correspondence with the junction 41, before entering into the processing unit using active carbons filtration 30, as described above.

The heavy fraction 47 exiting from the zigzag classifier 44 is sent to a magnetic drum 52, from which a stream of heavy fraction 54, and a rich stream of non-ferrous material 56 exit, whereas the filtrate of the filtering unit of final damping of powders is sent for disposal.

The invention claimed is:

1. A de-powdering plant able to be used downstream of a shredding machine and comprising a first processing section for processing a primary stream of powder and air arriving from a first exit line from the shredding machine, which comprises a unit for damping powders using humidity connected to an air intake downstream of the shredding machine, said first processing section also comprising a processing unit using active carbons filtration, downstream of the unit for damping powders using humidity, suitable for the adsorption of the volatile organic substances present in a stream of air exiting from the unit for damping powders using humidity, said plant comprises heating means to heat, directly or indirectly, the stream of air saturated with humidity exiting from the unit for damping powders using humidity, before it enters into the processing unit using active carbons filtration, wherein the processing unit comprises a feed line for air, heated by said heating means, which is fluidically connected to an exit line of the stream of air from the unit for damping powders using humidity, upstream of the processing unit using active carbons filtration, wherein the air from the feed line is mixed with the air from the exit line in order to generate a stream of air with reduced humidity entering the processing unit using active carbons filtration.

2. The plant as in claim 1, comprising a second processing section for classifying a heavier material arriving from a second exit line from the shredding machine and configured to obtain a secondary gaseous stream exiting from a classifying unit that is processed to produce a stream of purified air, wherein a line of the stream of purified air exiting from the second processing section constitutes the feed line of the air which, heated by the heating means, is mixed with the exit line of the stream of air from the unit for damping powders using humidity.

3. The plant as in claim 2, wherein the second processing section comprises, in sequence, a separator or zigzag classifier a cyclone-type unit for pre-damping powders and a damping unit with a sleeve-type filter.

4. The plant as in claim 2, wherein the second processing section comprises said heating means which heat the stream of purified air before it is mixed with the stream of saturated air exiting from the unit for damping powders using humidity.

5. The plant as in claim 2, wherein said heating means comprise a direct flame gas burner, which heats the stream of purified air exiting from the second processing station before it is mixed with the stream of saturated air exiting from the unit for damping powders using humidity.

6. The plant as in claim 1, wherein the processing unit using active carbons filtration is of the modular type, comprising a plurality of modules operatively connected in parallel.

7. A de-powdering method able to be used downstream of a shredding machine and comprising a step of processing a primary stream of powder and air exiting from the shredding machine, which comprises the execution of an operation to damp powders using humidity of air exiting from an air intake downstream of the shredding machine, said step of processing said primary stream also comprising the execution of a processing operation using active carbons filtration subsequent to the operation of damping powders using humidity, suitable for the adsorption of volatile organic substances present in a stream of air deriving from the operation of damping powders using humidity, said method also comprising the execution of a direct or indirect heating operation to heat the stream of air saturated with humidity deriving from the operation of damping powders using humidity, before said stream of air is subjected to the processing operation using active carbons filtration, wherein the operation to heat the stream of saturated air is carried out by mixing a stream of heated air with said stream of air, upstream of the processing operation using active carbons filtration.

8. The method as in claim 7, comprising a step of processing a heavier material arriving from the shredding machine which provides a classification operation with production of a secondary gaseous stream that is processed to produce a stream of purified air at an exit, wherein the classification operation heats the stream of purified air exiting from the step of processing the heavier material and mixes the stream of purified air with the stream of saturated air arriving from the operation of damping powders using humidity.

9. The method as in claim 8, wherein the step of processing the heavier materials comprises, in sequence, an operation of separating a heavy fraction to produce the secondary gaseous stream, an operation of separating a light fraction and an operation of damping the secondary gaseous stream by means of filtration with a sleeve filter to produce the stream of purified air.

10. The method as in claim 8, wherein the step of processing the heavier material comprises the operation of heating the stream of purified air extracted in this step before it is mixed with the stream of saturated air exiting from the operation of damping the powders using humidity.

11. The method as in claim 8, wherein the heating operation provides to use a direct flame gas burner which heats the stream of purified air exiting from the processing step of the heavier material and before the stream of purified air is mixed with the stream of saturated air exiting from the operation of damping the powders using humidity.

12. The method as in claim 7, wherein the processing operation using active carbons filtration is carried out by means of active carbon modules operatively connected in parallel.

13. The method as in claim 12, further comprising:

by-passing at least one of said modules, which remains inactive during the processing operation using active carbons filtration, so that, due to requirements of maintenance or regeneration of one of said modules, the inactive module can be selectively disconnected thus avoiding any stoppage of the processing operation.

* * * * *